(12) United States Patent
Atwi et al.

(10) Patent No.: US 12,384,053 B2
(45) Date of Patent: Aug. 12, 2025

(54) ROBOTIC GRIPPER APPARATUS

(71) Applicant: Ford Global Technologies, LLC, Dearborn, MI (US)

(72) Inventors: Hadi Atwi, Dearborn, MI (US); Richard Moore, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1008 days.

(21) Appl. No.: 17/470,827

(22) Filed: Sep. 9, 2021

(65) Prior Publication Data
US 2023/0071893 A1    Mar. 9, 2023

(51) Int. Cl.
*B25J 15/00* (2006.01)
*B25J 11/00* (2006.01)

(52) U.S. Cl.
CPC ......... *B25J 15/0028* (2013.01); *B25J 11/005* (2013.01)

(58) Field of Classification Search
CPC ............... B25J 15/0028; B25J 15/0033; B25J 15/0475; B25J 15/0253; B25J 11/005; B22F 12/88; B29C 64/379; B33Y 30/00; B33Y 40/00
See application file for complete search history.

(56) References Cited

U.S. PATENT DOCUMENTS

| | | | |
|---|---|---|---|
| 6,592,324 B2 * | 7/2003 | Downs ................. | B25J 17/0208 414/730 |
| 8,696,042 B2 * | 4/2014 | Rebstock .......... | H01L 21/67745 294/902 |
| 9,004,560 B2 * | 4/2015 | Umeno ..................... | B66C 1/42 901/31 |
| 9,362,152 B2 * | 6/2016 | Wada ...................... | B66C 13/18 |
| 9,457,480 B2 * | 10/2016 | Usami ..................... | B25J 15/10 |
| 10,625,430 B2 * | 4/2020 | Lee .......................... | B25J 15/08 |

FOREIGN PATENT DOCUMENTS

| | | |
|---|---|---|
| CN | 110281231 | 9/2019 |
| CN | 112549539 | 3/2021 |
| EP | 3797970 | 3/2021 |

OTHER PUBLICATIONS

Weber, Additive Manufacturing: The Quest for Automation, Assembly Magazine, 14 pages, Jul. 9, 2019, BNP Media.
Universal Robots, Voodoo Manufacturing—Voodoo Manufacturing Triples 3D Printing Production with Collaborative Robots, pp. 1-7, printed May 19, 2021.

* cited by examiner

*Primary Examiner* — Stephen A Vu
(74) *Attorney, Agent, or Firm* — Burris Law, PLLC

(57) ABSTRACT

A robotic gripper apparatus for an automated additive manufacturing production system (AAMPS) includes a pair of gripping assemblies. Each gripping assembly is moveable in a transverse direction between a first position in which the gripping assembly engages an AAMPS workpiece and a second position in which the gripping assembly is disengaged from the AAMPS workpiece. Each gripping assembly includes a gripping element that defines an interface slot configured to receive the AAMPS workpiece. The interface slot is defined by a pair of transversely extending edges of the gripping element and a longitudinal edge of the gripping element disposed between the pair of transversely extending edges.

20 Claims, 7 Drawing Sheets

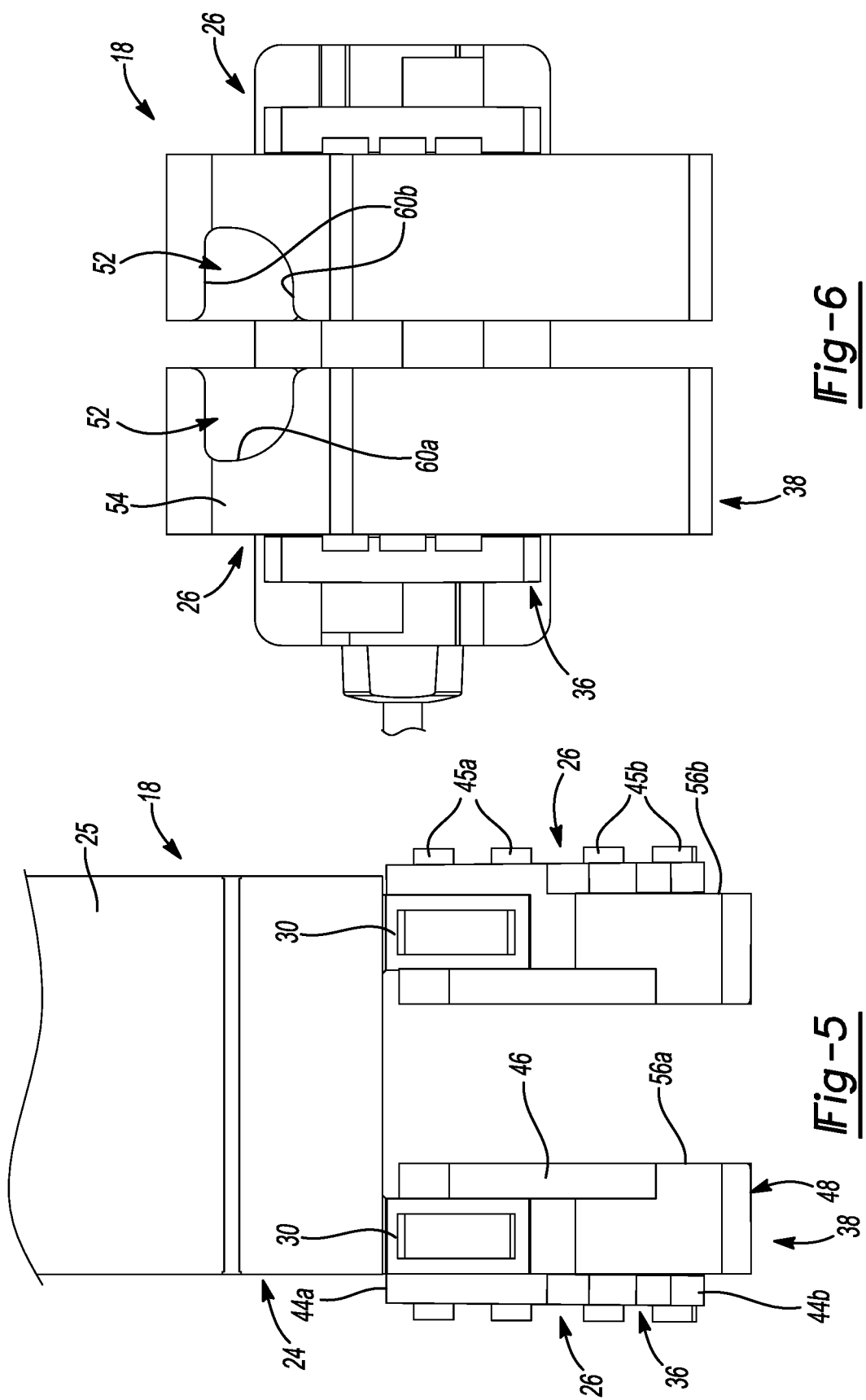

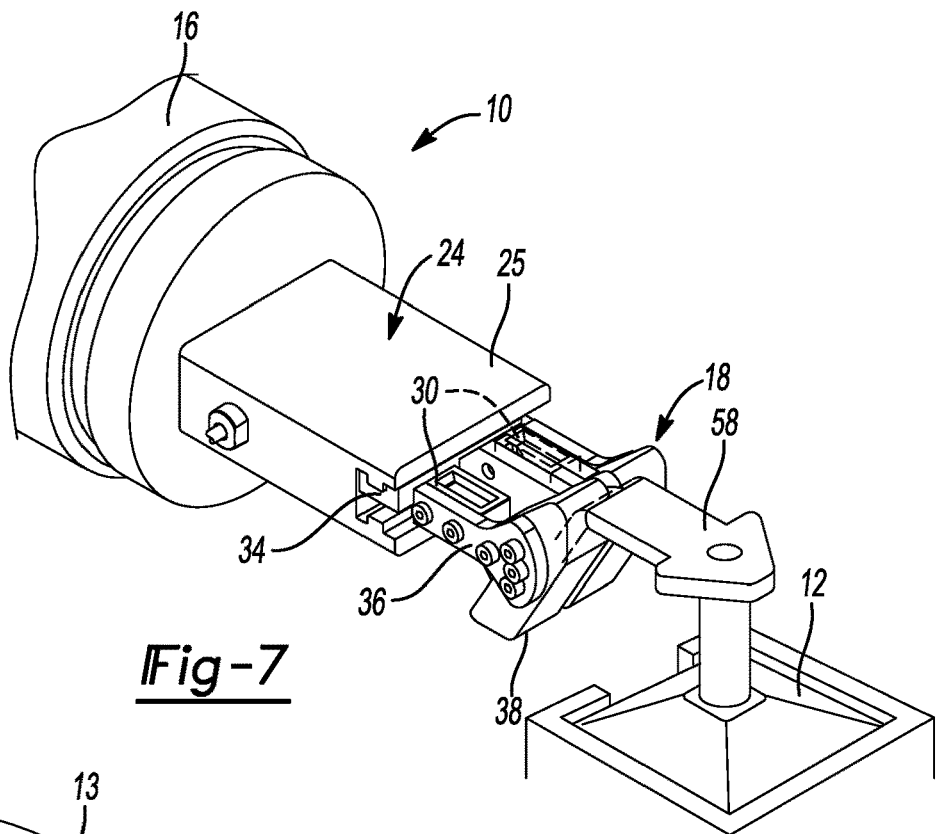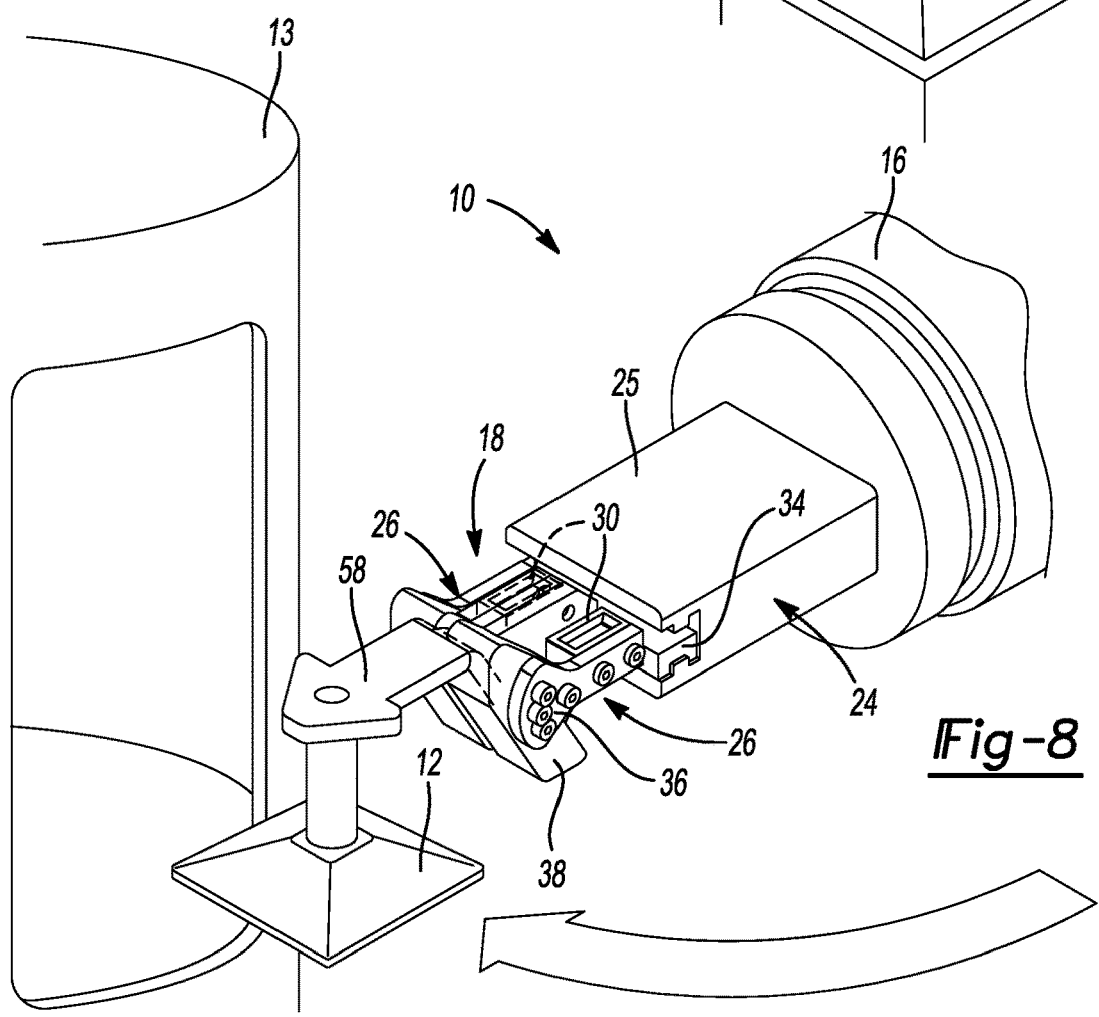

ROBOTIC GRIPPER APPARATUS

FIELD

The present disclosure relates to a robotic gripper apparatus and a robot including the robotic gripper apparatus.

BACKGROUND

The statements in this section merely provide background information related to the present disclosure and may not constitute prior art.

Industrial robots have been used for a variety of manufacturing operations, including by way of example, welding, placement of parts for subsequent fabrication or assembly operations, and moving parts from one location to another such as retrieving parts from a storage location and moving them to an assembly station. These industrial robots include end effectors, which are essentially the hands of the robot. In many applications, the end effectors are configured as grippers, which grasp a part and move the part to a different location or manipulate the position of the part for manufacturing operations.

Recently, additive manufacturing machines (i.e., 3-D printers) have been developed to manufacture parts out of metals, plastics, and other materials. Industrial robots including end effectors are used to move an automated additive manufacturing production system (AAMPS) workpiece from a storage location to the additive manufacturing machine. These end effectors come in a variety of configurations depending on the particular manufacturing operation. However, end effectors often lack proper handling of the workpiece and mechanical repeatability.

These issues related to robotic end effectors, among other issues related to robotic end effectors, are addressed by the present disclosure.

SUMMARY

This section provides a general summary of the disclosure and is not a comprehensive disclosure of its full scope or all of its features.

In one form, the present disclosure provides a robotic gripper apparatus for an automated additive manufacturing production system (AAMPS). The robotic gripper apparatus includes a pair of gripping assemblies. Each gripping assembly is moveable in a transverse direction between a first position in which the gripping assembly engages an AAMPS workpiece and a second position in which the gripping assembly is disengaged from the AAMPS workpiece. Each gripping assembly includes a gripping element defining an interface slot configured to receive the AAMPS workpiece. The interface slot is defined by a pair of transversely extending edges of the gripping element and a longitudinal edge of the gripping element disposed between the pair of transversely extending edges.

In variations of the robotic gripper apparatus of the above paragraph, which may be implemented individually or in any combination: the interface slot is elongated; the interface slots define an arcuate surface; the interface slot is open at one of the pair of transversely extending edges; the interface slot is sloped; when each gripping assembly is in the first position, the interface slots are configured to have an interference fit with the AAMPS workpiece; each gripping assembly includes a connecting member secured to a respective gripping element at a first end and to an actuator at an opposing second end; the gripping elements are disposed between the connecting members; the connecting member is secured to the respective gripping element via mechanical fasteners; an actuator is operable to move the pair of gripping assemblies between the first and second positions; and a positioning probe coupled to one of the pair of gripping assemblies.

In another form, the present disclosure provides a robotic gripper apparatus for an automated additive manufacturing production system (AAMPS). The robotic gripper apparatus includes an actuator assembly and a pair of gripping assemblies. The actuator assembly includes a pair of movable members. Each gripping assembly is secured to a respective movable member and is movable in a transverse direction between a first position in which the gripping assembly engages an AAMPS workpiece and a second position in which the gripping assembly is disengaged from the AAMPS workpiece. Each gripping assembly includes a gripping element defining an interface slot configured to receive the AAMPS workpiece. The interface slot is defined by a pair of transversely extending edges of the gripping element and a longitudinal edge of the gripping element disposed between the pair of transversely extending edges.

In variations of the robotic gripper apparatus of the above paragraph, which may be implemented individually or in any combination: the interface slot is elongated; the interface slot is open at one of the pair of transversely extending edges; the interface slot is sloped; each gripping element includes an attachment portion and an engaging portion, the attachment portion is secured to a respective movable member and the engaging portion defines the interface slot; the attachment portion includes a plurality of openings, and a slope of the interface slot is adjustable based on which one of the plurality of openings the respectable movable member is secured to; each gripping assembly includes a connecting member secured to a respective gripping element at a first end and to a respective movable member at an opposing second end; and the gripping elements are disposed between the connecting members.

In yet another form, the present disclosure provides a robotic gripper apparatus for an automated additive manufacturing production system (AAMPS). The robotic gripper apparatus includes an actuator assembly and a pair of gripping assemblies. The actuator assembly includes a pair of movable members. Each gripping assembly is secured to a respective movable member and movable in a transverse direction between a first position in which the gripping assembly engages an AAMPS workpiece and a second position in which the gripping assembly is disengaged from the AAMPS workpiece. Each gripping assembly includes a gripping element and a connecting member. The gripping element includes an attachment portion and an engaging portion. The attachment portion is secured to a respective movable member and the engaging portion defines an interface slot configured to receive the AAMPS workpiece. The connecting member is secured to a respective gripping element at a first end and a respective movable member at an opposing second end. The interface slot is defined by a pair of transversely extending edges of the gripping element and a longitudinal edge of the gripping element is disposed between the pair of transversely extending edges.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a top view of the gripper apparatus of FIG. 1 in the open position;

FIG. 6 is a front view of the gripper apparatus of FIG. 1 in the closed position;

FIG. 7 is a perspective view of the gripper apparatus of FIG. 1 in the closed position grasping the AAMPS workpiece;

FIG. 8 is a perspective view of the gripper apparatus of FIG. 1 moving the AAMPS workpiece from a workstation to an automated additive manufacturing machine (3-D printer)

Figure 1:
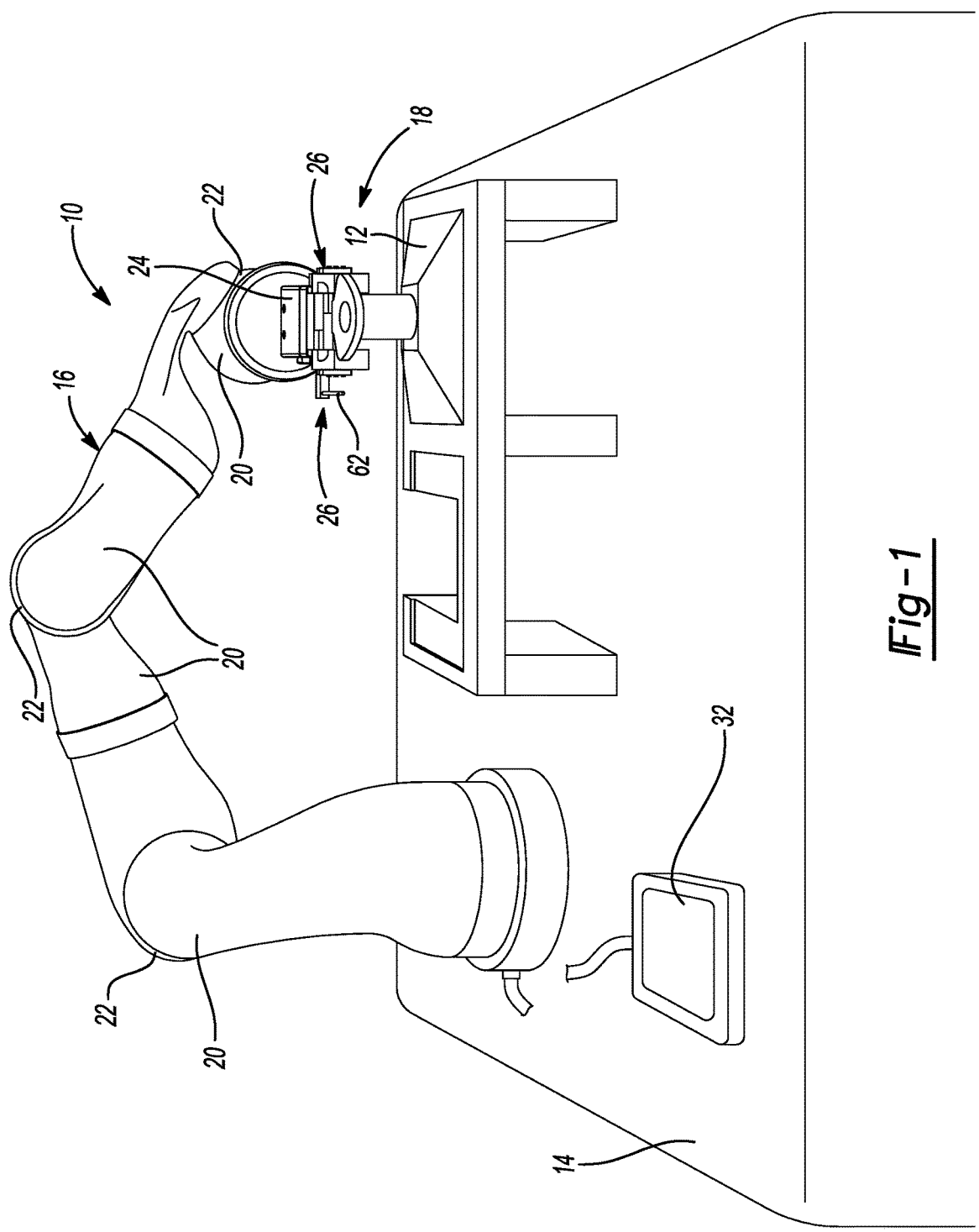
FIG. 1 is a perspective view of a robot including a gripper apparatus in an open position according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a robot 10 for grasping and moving an automated additive manufacturing production system (AAMPS) workpiece 12 is provided. In the example illustrated, the AAMPS workpiece 12 is a carbon platform. However, the AAMPS workpiece 12 may be other suitable objects in which a component may be built using an automated additive manufacturing machine 13 (FIG. 8; i.e., a 3-D printer). In the example illustrated, the robot 10 is positioned on and secured to a movable platform 14 (i.e., the platform 14 moves to a workstation where the robot 10 grasps and moves the workpiece 12 from a supporting rack, for example, to the additive manufacturing machine 13). The platform 14 may be moved automatically or manually. However, in some variations, the robot 10 may be positioned on a fixed platform located near or at the workstation.

The robot 10 includes a robot arm 16 and a robotic gripper apparatus 18. The robot arm 16 includes a plurality of segments 20 connected to each other at joints 22, thereby allowing the robot 10 to have multiple degrees of freedom. The robot arm 16 is also secured to the movable platform 14 at a first end. In some variations, the robot arm 16 includes an optional adapter (not shown) that is adapted to be secured to the movable platform 14.

With reference to FIGS. 1-9, the robotic gripper apparatus 18 includes an actuator assembly 24 and a pair of gripping assemblies 26. The actuator assembly 24 is secured to an opposing second end of the robot arm 16 (FIGS. 1, 7, and 8). The actuator assembly 24 includes a body 25, a motor 28 (FIG. 9), and a pair of movable members or arms 30 (FIGS. 2-5, 7, and 8). The body 25 is secured to the opposing second end of the robot arm 16. The motor 28 is associated with the body 25 (e.g., disposed within the body 25) and is in electrical communication with a controller 32 (FIG. 1) of the robot 10. The controller 32 may be in communication with the motor 28 via, for example, an internet, Wi-Fi, Bluetooth®, Zigbee®, power-line carrier communication (PLCC), or cellular connection or any other wired or wireless communication protocol. The motor 28 is operable between an OFF mode and an ON mode. In one form, the motor 28 may be an electric motor such as a brushless drive motor. Each arm 30 is operatively connected to the motor 28 via a respective rail or connecting member 34 and is allowed to move in a transverse direction (i.e., transverse to a longitudinal direction of the body 25). For example, when the motor 28 is in the OFF mode, the arms 30 are inhibited from moving in the transverse direction. When the motor 28 is in the ON mode, the arms 30 are allowed to move in the transverse direction between an open state and a closed state.

Each gripping assembly 26 is secured to a respective arm 30 and is movable in the transverse direction between a first or closed position (FIGS. 2, 4, and 6-8) and a second or open position (FIGS. 1 and 5). Stated differently, each gripping assembly 26 is secured to the respective arm such that when the respective arm 30 is moved to the closed state, the gripping assembly 26 is moved the closed position (when the gripping assemblies 26 are in the closed position, the gripping assemblies 26 are spaced apart from each other), and when the respective arm 30 is in the open state, the gripping assembly 26 is in the open position.

Figure 3:
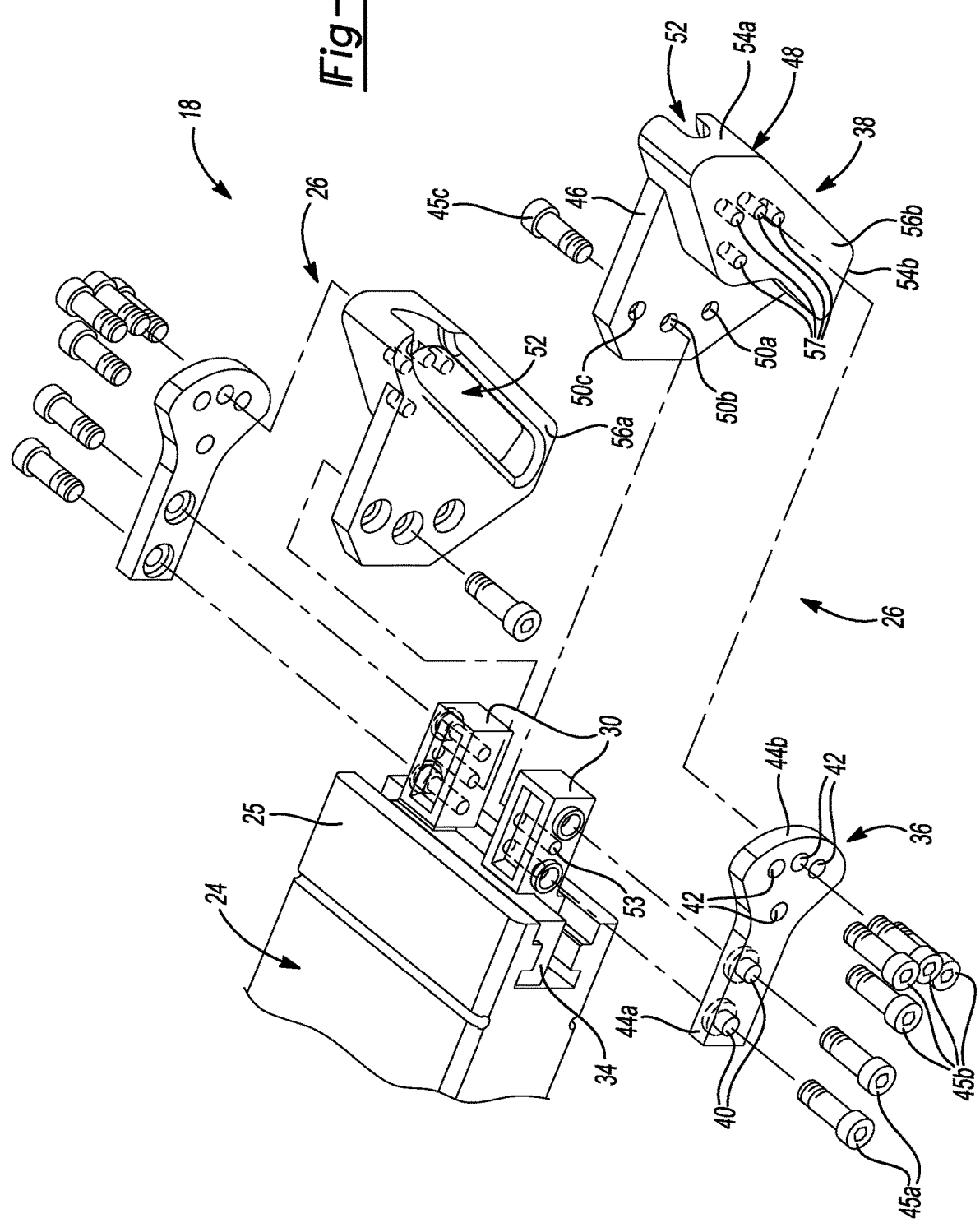
FIG. 3 is an exploded view of the gripper apparatus of FIG. 1.
Figure 4:
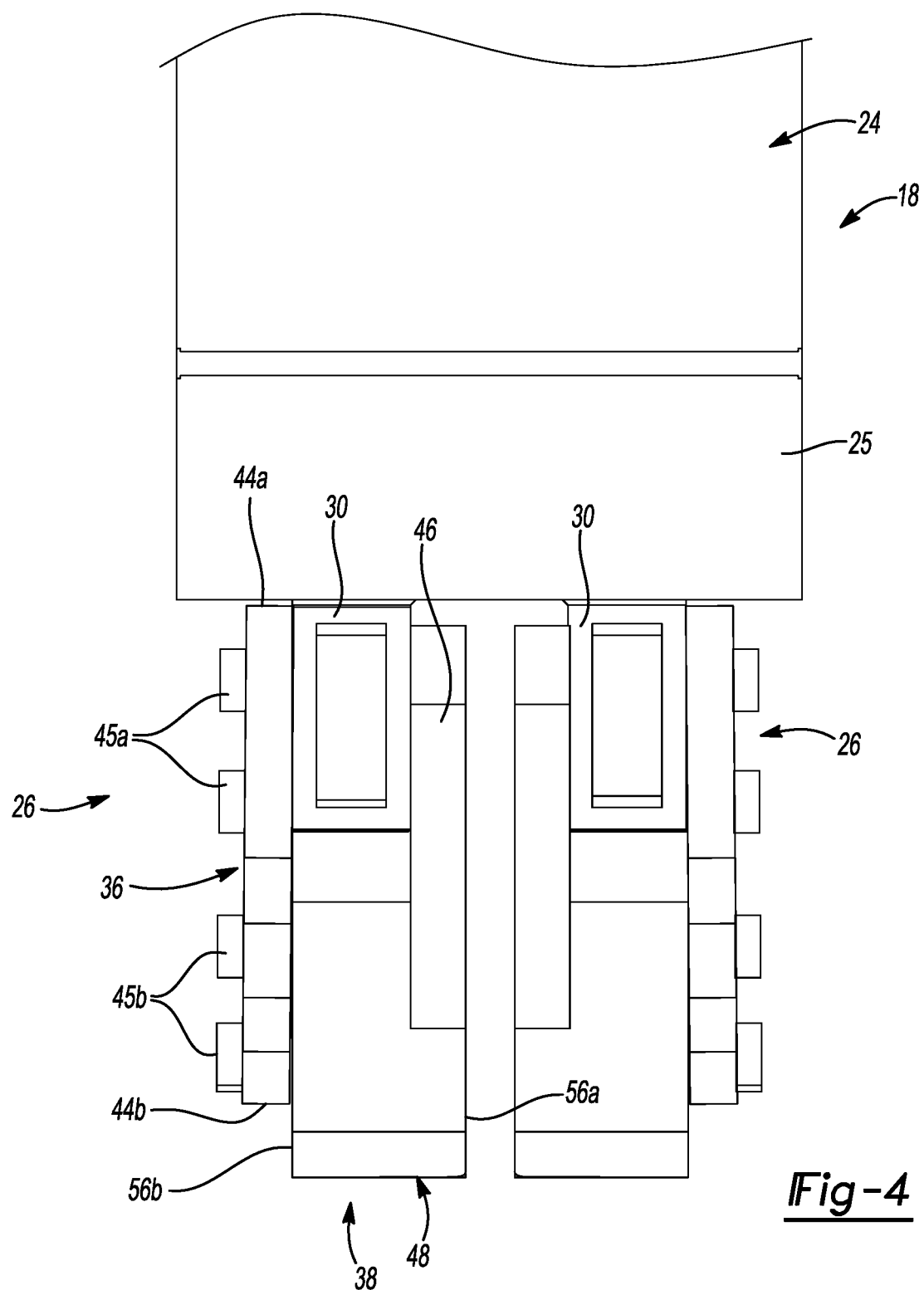
FIG. 4 is a top view of the gripper apparatus of FIG. 1 in the closed position.
Figure 9:
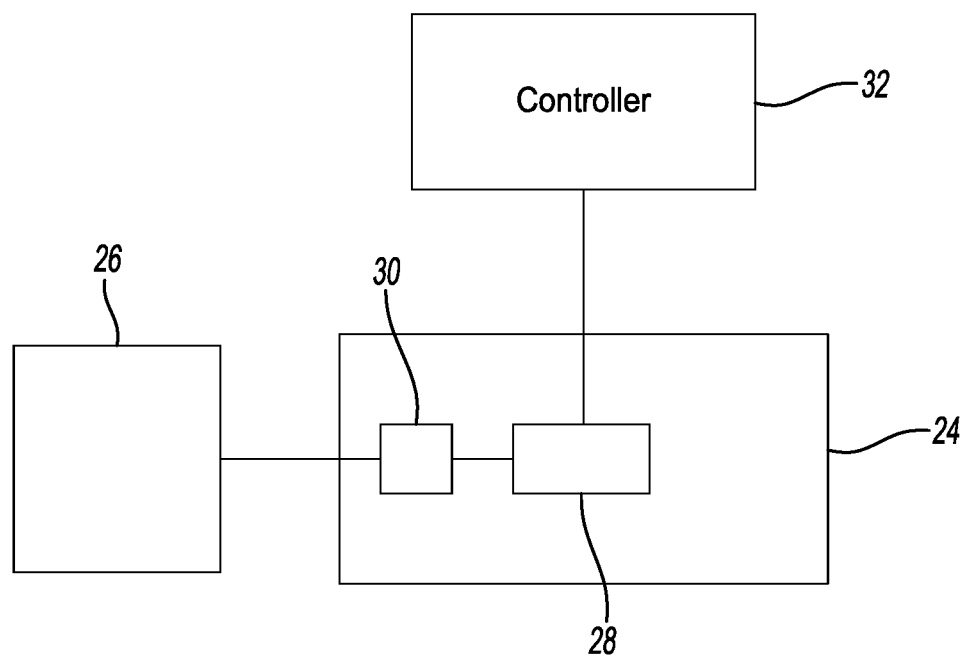
FIG. 9 is a schematic block diagram showing components of the gripper apparatus of FIG. 1.

Each gripping assembly 26 includes a connecting member 36 and a gripping element 38. The connecting members 36 may have a uniform thickness and are positioned outwardly relative to the arms 30 and gripping elements 38 (i.e., the arms 30 and the gripping elements 38 are positioned between the connecting members 36). As shown in FIG. 3, each connecting member 36 includes a plurality of first openings 40 located at or near a first end 44a thereof and a plurality of second openings 42 located at or near an opposing second end 44b thereof. In the example illustrated, the first end 44a may have a generally rectangular shape and the second end 44b may have a generally triangular shape such that the second end 44b includes a greater surface area than a surface area of the first end 44a. However, in some variations, the first end 44a and the second end 44b may be of other suitable shapes or may be of the same shape. The connecting member 36 may be mechanically fastened to a first side of a respective arm 30 at the first end 44a via fasteners 45a (e.g., rivets, bolts, screws, etc.) extending through the first openings 40. Similarly, the connecting member 36 may be mechanically fastened to a respective gripping element 38 at the second end 44b via fasteners 45b (e.g., rivets, bolts, screws, etc.) extending through the second openings 42. In some variations, the connecting member 36 may be attached to the respective arm 30 and the respective gripping element 38 via welding or any other suitable attachment means.

Each gripping element 38 includes an attachment portion 46 configured to couple to the connecting member and an engaging portion 48 configured to interface with the AAMPS workpiece 12. The attachment portion 46 extends from the engaging portion 48 and has a thickness that is less than a thickness of the engaging portion 48. The attachment portion 46 is also secured to an opposing second side of a respective arm 30 (FIGS. 4 and 5; i.e., the respective arm 30 is positioned between the attachment portion 46 of the gripping element 38 and the first end 44a of the connecting member 36). The attachment portion 46 includes a plurality of openings 50a, 50b, 50c extending therethrough. The openings 50a, 50b, 50c may be aligned with each other along an arc. A fastener 45c extends through an opening 53 of the respective arm 30 and through one of the openings 50a, 50b, 50c of the attachment portion 46, thereby securing the gripping element 38 to the respective arm 30. In this way, a slope of an elongated interface slot 52 of the engaging portion 48 is adjustable based on which one of the plurality of openings 50a, 50b 50c the fastener 45c extends through. For example, the slope of the interface slot 52 will be greater if the fastener 45c extends through opening 50a than if the fastener 45c extends through opening 50b. In another example, the slope of the interface slot 52 will be greater if the fastener 45c extends through opening 50b than if the fastener 45c extends through opening 50c.

The engaging portion 48 includes a pair of transversely extending edges 54a, 54b, a pair of longitudinally extending edges 56a, 56b, and the interface slot 52. The longitudinally extending edge 56b includes openings 57 that are aligned with the second openings 42 of the connecting member 36. In this way, the fasteners 45b extend through the openings 42, 57 to secure the connecting member 36 and the gripping element 38 to each other. The interface slot 52 is configured to receive the AAMPS workpiece 12. In one form, the interface slot 52 is configured to have an interference fit with the handle 58 of the AAMPS workpiece 12 when the gripping assembly 26 interfaces with the AAMPS workpiece 12.

Figure 2:
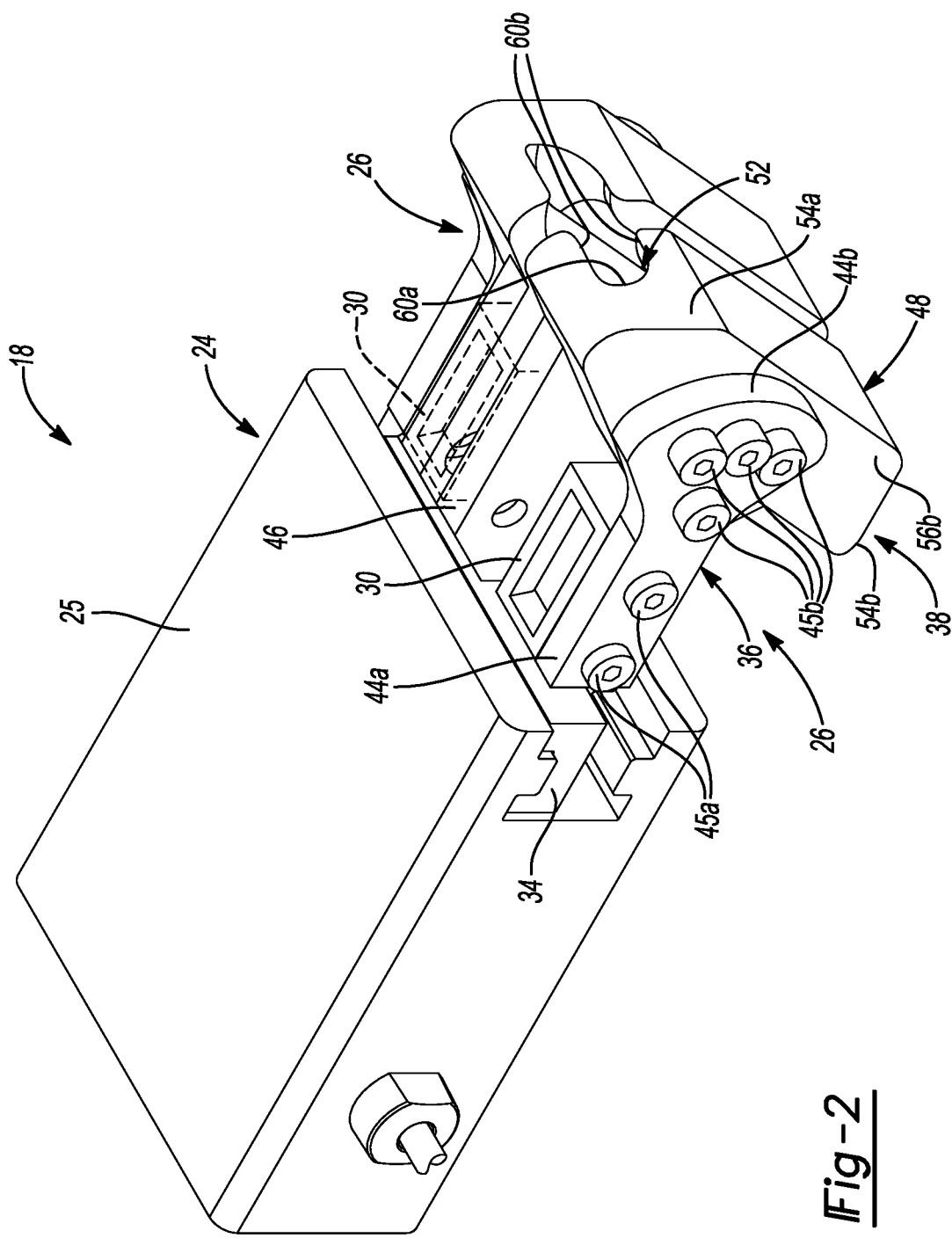
FIG. 2 is a perspective view of the gripper apparatus of FIG. 1 in a closed position.

The interface slot 52 is defined by the pair of transversely extending edges 54a, 54b and the longitudinally extending edge 56a. The interface slot 52 is open at the transversely extending edge 54a and the longitudinally extending edge 56a. The interface slot 52 corresponds to the handle 58 of the AAMPS workpiece 12 (i.e., the shape of the interface slot 52 corresponds to the shape of the handle 58 of the AAMPS workpiece 12). As shown in FIGS. 2 and 6, the interface slot 52 includes an arcuate back surface 60a and opposing flat surfaces 60b that may contact the handle 58 of the AAMPS workpiece 12 when the gripping assemblies 26 are in the first position.

In an example operation, with the robotic gripper apparatus 18 in the open position (i.e., the gripper assemblies 26 and arms 30 are in the open position), the gripper assemblies 26 re positioned such that the gripper elements 38 are provided on either side of the handle 58 of the AAMPS workpiece 12. The robotic gripper apparatus 18 is positioned in the closed position (i.e., the gripper assemblies 26 and the arms 30 are in the closed position) to have the gripper elements 38 engage with and form an interference fit with the handle 58 of the AAMPS workpiece 12. That is, the handle 58 of the AAMPS workpiece 12 is received in the interface slots 52 (FIGS. 7 and 8), thereby securing the AAMPS workpiece 12 to the pair of gripping assemblies 26. The robot 10 moves and positions the AMMPS workpiece 12 at a specific destination (e.g., AAM machine 13, fixture at staging area, etc.) and once at the destination, the robotic gripper apparatus 18 is provided in the open position to release the AAMPS workpiece 12. That is, the gripping assemblies 26 and arms 30 transversely move to the open position (FIGS. 1 and 5) such that the interface slots 52 disengage from the AAMPS workpiece 12.

In one form, since the gripper assemblies 26 form an interference fit with the AAMPS workpiece 12, the tolerance of the robotic gripper apparatus 18 with respect to the AAMS workpiece 12 can be tight (e.g., ±0.5 mm). Accordingly various techniques may be employed to accurately locate and engage with the AAMS workpiece 12. For example, in one form, the robotic gripper apparatus 18 includes a positioning probe 62 coupled to one of the pair of gripping assemblies 26 and is employed by the controller 32 to perform a localization routine to determine a positional offset of the robot 10 with respect to a defined nominal position of the gripper robotic gripper apparatus 18. Such a localization routine is disclosed in Applicant's co-pending application titled "METHOD AND SYSTEM FOR POSITIONING A ROBOTIC SYSTEM" which is commonly owned with the present application and the contents of which are incorporated herein by reference in its entirety. In addition to or in lieu of the positioning probe, other locating and positioning techniques may be employed. For example, a vision system having one or more cameras distributed about the robot 10 may be used to control operation of the robotic gripper apparatus 18.

The robotic gripper apparatus 18 of the present disclosure provides the benefit of repeatability when moving AAMPS workpieces between the workstation and the automated additive manufacturing machine. The robotic gripper apparatus 18 of the present disclosure also provides the benefit of maintaining a working surface (i.e., a surface containing the additively manufactured component) of the AAMPS workpiece planar when moving the AAMPS workpiece from the automated additive manufacturing machine back to the workstation. While specific benefits are provided, it should be readily understood that other benefits may be realized with the robotic gripper apparatus 18 of the present disclosure.

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A robotic gripper apparatus for an automated additive manufacturing production system (AAMPS), the robotic gripper apparatus comprising:
a pair of gripping assemblies movable relative to each other in a transverse direction between a first position in which the gripping assemblies engage an AAMPS workpiece and a second position in which the gripping assemblies are disengaged from the AAMPS workpiece, each gripping assembly including a gripping element defining an interface slot configured to receive the AAMPS workpiece,
wherein the interface slot is defined by a pair of transversely extending edges of the gripping element and a longitudinal edge of the gripping element disposed between the pair of transversely extending edges.

2. The robotic gripper apparatus of claim 1, wherein the interface slot is elongated.

3. The robotic gripper apparatus of claim 1, wherein the interface slots define an arcuate surface.

4. The robotic gripper apparatus of claim 1, wherein the interface slot is open at one of the pair of transversely extending edges.

5. The robotic gripper apparatus of claim 1, wherein the interface slot is sloped.

6. The robotic gripper apparatus of claim 1, wherein when each gripping assembly is in the first position, the interface slots are configured to have an interference fit with the AAMPS workpiece.

7. The robotic gripper apparatus of claim 1, wherein each gripping assembly includes a connecting member, the connecting member is secured to a respective gripping element at a first end and to an actuator at an opposing second end.

8. The robotic gripper apparatus of claim 7, wherein the gripping elements are disposed between the connecting members.

9. The robotic gripper apparatus of claim 7, wherein the connecting member is secured to the respective gripping element via mechanical fasteners.

10. The robotic gripper apparatus of claim 1 further comprising an actuator operable to move the pair of gripping assemblies between the first and second positions.

11. The robotic gripper apparatus of claim 1 further comprising a positioning probe coupled to one of the pair of gripping assemblies.

12. A robotic gripper apparatus for an automated additive manufacturing production system (AAMPS), the robotic gripper apparatus comprising:
an actuator assembly including a pair of movable members; and
a pair of gripping assemblies, each gripping assembly secured to a respective movable member and movable in a transverse direction between a first position in which the gripping assembly engages an AAMPS workpiece and a second position in which the gripping assembly is disengaged from the AAMPS workpiece, each gripping assembly including a gripping element defining an interface slot configured to receive the AAMPS workpiece,
wherein the interface slot is defined by a pair of transversely extending edges of the gripping element and a longitudinal edge of the gripping element disposed between the pair of transversely extending edges.

13. The robotic gripper apparatus of claim 12, wherein the interface slot is elongated.

14. The robotic gripper apparatus of claim 12, wherein the interface slot is open at one of the pair of transversely extending edges.

15. The robotic gripper apparatus of claim 12, wherein the interface slot is sloped.

16. The robotic gripper apparatus of claim 12, wherein each gripping element includes an attachment portion and an engaging portion, the attachment portion is secured to a respective movable member and the engaging portion defines the interface slot.

17. The robotic gripper apparatus of claim 16, wherein the attachment portion includes a plurality of openings, and wherein a slope of the interface slot is adjustable based on which one of the plurality of openings the respectable movable member is secured to.

18. The robotic gripper apparatus of claim 12, wherein each gripping assembly includes a connecting member, the connecting member is secured to a respective gripping element at a first end and to a respective movable member at an opposing second end.

19. The robotic gripper apparatus of claim 18, wherein the gripping elements are disposed between the connecting members.

20. A robotic gripper apparatus for an automated additive manufacturing production system (AAMPS), the robotic gripper apparatus comprising:
an actuator assembly including a pair of movable members; and
a pair of gripping assemblies, each gripping assembly secured to a respective movable member and movable in a transverse direction between a first position in which the gripping assembly engages an AAMPS workpiece and a second position in which the gripping assembly is disengaged from the AAMPS workpiece, each gripping assembly including:
a gripping element including an attachment portion and an engaging portion, the attachment portion secured to a respective movable member and the engaging portion defining an interface slot configured to receive the AAMPS workpiece; and
a connecting member secured to a respective gripping element at a first end and a respective movable member at an opposing second end,
wherein the interface slot is defined by a pair of transversely extending edges of the gripping element and a longitudinal edge of the gripping element disposed between the pair of transversely extending edges.

\* \* \* \* \*